United States Patent
Levin et al.

(10) Patent No.: US 7,984,925 B2
(45) Date of Patent: Jul. 26, 2011

(54) DEVICE FOR USE WITH LIQUID CONTAINER FOR A VEHICLE AND METHOD FOR MOUNTING SAID LIQUID CONTAINER

(75) Inventors: Göran Levin, Hisings-Kärra (SE); Jan-Olof Bodin, Alingsås (SE)

(73) Assignee: Volvo Lastvagnar AB, Göteborg (SE)

( * ) Notice: Subject to any disclaimer, the term of this patent is extended or adjusted under 35 U.S.C. 154(b) by 149 days.

(21) Appl. No.: 12/095,185

(22) PCT Filed: Dec. 14, 2006

(86) PCT No.: PCT/SE2006/001429
§ 371 (c)(1), (2), (4) Date: May 28, 2008

(87) PCT Pub. No.: WO2007/069987
PCT Pub. Date: Jun. 21, 2007

(65) Prior Publication Data
US 2008/0284152 A1 Nov. 20, 2008

(30) Foreign Application Priority Data
Dec. 15, 2005 (SE) ...................................... 0502802

(51) Int. Cl.
*B65D 88/12* (2006.01)
(52) U.S. Cl. ......... 280/833; 280/834; 220/562; 105/358
(58) Field of Classification Search .................. 280/830, 280/831, 834, 837–839
See application file for complete search history.

(56) References Cited

U.S. PATENT DOCUMENTS

| 2,357,148 | A | * | 8/1944 | Turner | 280/833 |
| 2,569,493 | A | * | 10/1951 | Prior | 280/833 |
| 2,622,887 | A | * | 12/1952 | Prior | 280/833 |
| 4,553,681 | A | * | 11/1985 | Heaume | 220/675 |
| 5,054,799 | A | * | 10/1991 | Fingerle | 280/164.1 |

(Continued)

FOREIGN PATENT DOCUMENTS

DE 1211860 B 3/1966

(Continued)

OTHER PUBLICATIONS

International Search Report from corresponding International Application PCT/SE2006/001429.

*Primary Examiner* — Jeffrey J Restifo
*Assistant Examiner* — Erez Gurari
(74) *Attorney, Agent, or Firm* — WRB-IP LLP

(57) ABSTRACT

A liquid tank is provided for a heavy vehicle, suitable for fastening to a vehicle frame by at least one supporting bracket having shaped surfaces arranged for load bearing and locating contact against the liquid tank. The tank includes two end face portions and a shell portion with a non-symmetrical cross-section extending there between. The tank includes a first, shaped portion facing the vehicle frame, arranged for load bearing contact against a first shaped surface of the supporting bracket, a second, shaped portion extending partially below the frame, arranged to locate the tank relative to a second shaped surface of the supporting bracket, and a third, substantially rectangular portion facing away from the vehicle frame, and that the tank is fastened to the bracket by at least one clamping means. A bracket for supporting such a tank is also disclosed.

18 Claims, 6 Drawing Sheets

U.S. PATENT DOCUMENTS

| | | | |
|---|---|---|---|
| 6,053,533 A * | 4/2000 | Osborn et al. | 280/830 |
| 6,378,823 B1 * | 4/2002 | Edholm | 248/219.4 |
| 6,402,198 B2 | 6/2002 | Gollunberg | |
| 6,896,318 B2 * | 5/2005 | Marrs et al. | 296/191 |
| 2006/0006635 A1 * | 1/2006 | Sonderegger | 280/830 |

FOREIGN PATENT DOCUMENTS

| | | |
|---|---|---|
| EP | 0947388 A1 | 10/1999 |
| EP | 1464528 A2 | 10/2004 |
| WO | 9312946 A1 | 7/1993 |

* cited by examiner

DEVICE FOR USE WITH LIQUID CONTAINER FOR A VEHICLE AND METHOD FOR MOUNTING SAID LIQUID CONTAINER

BACKGROUND AND SUMMARY

The present invention relates to a device for use with a liquid tank for a vehicle, in particular a device for supporting and securing the liquid tank on the vehicle in the form of at least one supporting bracket fixed to the vehicle and provided with members for locating and securing the tank to the supporting bracket, and to a tank having locating members for facilitating mounting and fixing of the tank to the supporting bracket.

Liquid tanks for heavy vehicles, especially fuel tanks and the like for heavy goods vehicles, are usually configured in substantially cylindrical form with two end faces and an intermediate shell surface. There are two main types of tanks available on the market, one of which has circular-cylindrical cross-section, hereinafter referred to as a circular tank, and the other of which has a rectangular-cylindrical, hereinafter referred to as a rectangular tank. In addition, an alternative type of tank forms a combination of the circular and rectangular tank, resulting in an asymmetrical or D-shaped cross-section.

One advantage with a circular tank is that, owing to its round tank bottom shape, it has a minimal volume of residual liquid, that is, the liquid which can never be drawn out of the tank as a result of the suction tube of the tank being located, by necessity, at a certain distance from the bottom of the tank. A further advantage with the circular tank is that it is fastened to the vehicle frame by two relatively compact and weight-saving supporting brackets. Brackets of this type offer good ground clearance by virtue of being designed as a vertical cradle having a part-circular bearing surface for the tank. The supporting brackets are provided with fixtures for straps, by which the circular tank is forced in against the cradles of the supporting brackets.

Circular tanks have the drawback that they offer a smaller liquid capacity. They may also mm the risk of rotating relative to the fastening arrangement, thereby generating stresses upon the tank fittings, such as connecting elements for connecting pipes to the tank. Because of their circular shape, these tanks require no special positioning during mounting onto the vehicle, since they can easily be rotated into the correct position before being clamped in place.

One widely adopted solution for supporting a tank, especially for heavy vehicles, is to utilize an L-shaped supporting bracket. This bracket reaches in beneath the tank and cooperates with straps which are fastened at the outer ends of the supporting bracket and which, together with the bracket, embrace the tank in order to secure it to the bracket. The tank is in this case usually rectangular, with corner portions which are somewhat rounded. In this type of supporting bracket, the part reaching in beneath the tank requires space in the vertical direction, which means that the total space for tank and bracket cannot be utilized effectively for the storage of liquid, since the ground clearance requirement limits the space downward. One advantage with the rectangular tank is that, precisely by virtue of its rectangular shape, it has no tendency to rotate in its fastening during travel.

A further solution is constituted by an asymmetrical, for example D-shaped, tank, in which the part of the tank which bears against a bracket fixed to the vehicle has a cylindrical, oval or similar rounded shape. These embodiments are below termed "part-circular". Such a tank is able to combine the advantages of the abovementioned tank types. Owing to its extent transversely to the longitudinal axis of the vehicle, the tank must, however, be accurately positioned when mounted and must be clamped in place such that it cannot be turned or rotated in any direction, since a small turn in connection with the bracket can produce a relatively large displacement of the outer end of the tank.

The present invention aims to provide an improved fastening arrangement for a liquid tank for a vehicle, which fastening arrangement will simplify mounting and fixing of the tank to a bracket on the vehicle. The invention further aims to provide a tank that allows the available volume for the storage of liquid to be maximized.

It is desirable to provide a fastening arrangement for use with a liquid tank, which arrangement allows for maximum utilization of the available space for the storage of liquid. It is also desirable to provide a fastening arrangement that allows the liquid tank to be easily mounted and subsequently held securely fixed in a predetermined position. The tank is preferably, but not necessarily, intended for some form of propellant for the vehicle engine or an auxiliary engine, urea for the after-treatment of exhaust gases, water or other liquids.

According to aspects of the invention, a liquid tank is provided and according to another aspect a fastening arrangement is provided.

According to a preferred embodiment, the invention relates to a liquid tank for a heavy vehicle, suitable for fastening to a vehicle frame by at least one supporting bracket having shaped surfaces suitable for load bearing and locating contact against said liquid tank, which the tank comprises two end face portions and a shell portion with a non-symmetrical cross-section extending there between. The tank may comprise a first, shaped portion facing the vehicle frame, arranged for load bearing contact against a first shaped surface of the supporting bracket, a second, shaped portion extending partially below said frame, arranged to locate the tank relative to a second shaped surface of the supporting bracket, and a third, substantially rectangular portion facing away from the vehicle frame. In this case, the term "substantially rectangular" is intended to include shapes ranging from a standard rectangular shape, with or without rounded corners, to a general rectangular shape, having rounded corners and curved outer side surfaces. The tank may be fastened to the supporting bracket by at least one clamping means.

The first, shaped portion of the tank may have an upper section arranged to take up a substantially horizontal load between the tank and the first shaped surface of the supporting bracket. In addition, the first, shaped portion of the tank may have a lower section arranged to take up a substantially vertical load between the tank and the first shaped surface of the supporting bracket.

The shaped portion of the tank is arranged to substantially conform to cooperating contact surfaces on the supporting bracket. This may be achieved by providing the tank with a recess having substantially the same shape as at least a part of an outer and/or lower portion of the supporting bracket. The recess in the tank may extend at least along the horizontal extension of the supporting bracket. On either side of the recess required for load bearing contact with the bracket, the tank may extend in close proximity to, but not in contact with, the frame. The vertical extent of the recess is also determined by the shape of the supporting bracket.

According to a further embodiment, the first, shaped portion of the tank may have a lower section provided with an indentation, extending an additional distance into the tank with respect to said recess, for cooperation with a corresponding protrusion on at least a lower section of the first, shaped portion of the supporting bracket.

Both the recess and the indentation can be shaped during the manufacture of the tank, for example by injection moulding of a plastics tank. Alternatively, the recess can be made during manufacture of the tank, while the indentation can be shaped subsequently, for instance by means of a heated tool having the basic shape of the supporting bracket.

In this context, terms such as "inner" or "towards" and "outer" or "away from" are to be interpreted as directions in relation to the vehicle frame onto which the tank is attached. The frame may comprise a beam having cross-section in the form of a C-profile, a closed profile or any other suitable profile having a substantially vertical section or surface facing away from a longitudinal central axis through the vehicle and a substantially horizontal lower section or surface.

The second, shaped portion of the tank extending partially below said frame may be arranged to locate the tank relative to the second shaped surface of the supporting bracket. This may be achieved by providing the tank with a substantially horizontal or slightly curved surface facing a correspondingly shaped lower surface on the supporting bracket. These corresponding surfaces are not required to take up any substantial forces relating to the weight of the tank, as their main function is to locate the tank during mounting and preventing it from rotating when clamped onto the supporting bracket. Both below and on either side of the supporting bracket, the tank may extend below said frame up to a vertical plane delimiting an inner longitudinal surface of the frame or the profile making up the frame.

In order to prevent the tank from deforming or buckling when being clamped to the bracket the tank is provided with a substantially vertical supporting wall around at least parts of its internal circumference adjacent each bracket. This wall may also be used to prevent the liquid from surging between the ends of the tank. The extension of the radial wall into the tank may vary around the circumference of the tank. For instance, adjacent to the lower part of the tank, the wall may be relatively low or be provided with apertures in order to allow liquid to flow towards a suction conduit extending into the tank. The lower end of the suction conduit is preferably located at the lowest point of the tank, to allow a maximum volume of liquid to be removed. The lowest point of the tank may be located in a recess in the tank, which recess can extend below the main part of the lower surface of the tank.

The tank is fastened to the bracket by a clamping means attached to the supporting bracket and extending around the outer circumference of the tank. The clamping means may be a flexible steel band or a similar suitable means. Attachment points for the clamping means may be provided on or adjacent an upper part of the supporting bracket, such as the upper section of the first, shaped portion thereof, and on or adjacent a lower part of the supporting bracket, such as an inner section of the second shaped surface of the supporting bracket.

Alternatively, the tank may be fastened to the bracket by a first clamping means extending over the tank from the upper part of the supporting bracket to an outer, lower corner of the substantially rectangular portion of the tank. A second clamping means may be provided extending under the tank from the lower part of the supporting bracket to the outer, lower corner of the third, substantially rectangular portion.

In order to locate the clamping means, recesses for said means may be provided adjacent at least one upper or lower outer corner of the substantially rectangular portion of the tank. Such locating means prevents the tank from moving in its longitudinal direction after mounting and fixing.

The invention further relates to a fastening arrangement for supporting a liquid tank on a frame for a heavy vehicle, which fastening arrangement comprises at least one supporting bracket having shaped surfaces arranged for load bearing and locating contact against said liquid tank, which the tank comprises two end face portions and a shell portion with a non-symmetrical cross-section extending there between, as described above. The supporting bracket may be attached to a substantially vertical surface of the vehicle frame and may comprise a first, shaped portion. The first portion may be arranged for load bearing contact against a first shaped surface of the tank. The supporting bracket may be in contact with a lower surface of said frame and may comprise a second, shaped surface arranged to extend partially below the frame and to locate the tank relative to a second shaped portion of the tank. Attachment means may be provided for fastening the tank to the bracket by at least one clamping means.

The first, shaped portion of the supporting bracket may have an upper section arranged to support a substantially horizontal load between the supporting bracket and the first shaped surface of the tank. The upper section of the first, shaped portion of the supporting bracket may be substantially parallel to or angled downwards and away from the frame. Alternatively, the upper section may be curved a short distance downwards and towards the frame towards a transition point between the upper section and a lower section. At this point the supporting bracket has a minimum cross-sectional thickness in a vertical plane at right angles to the longitudinal direction of the frame.

The first, shaped portion of the supporting bracket may further have a lower section arranged to support a substantially vertical load between the supporting bracket and the first shaped surface of the tank. At least this lower section may be arranged to extend into a corresponding recess in the tank. The lower section of the first, shaped portion of the supporting bracket may be angled downwards and away from the frame at angle of 30-50°. Alternatively the lower section may be curved downwards and away from the frame, in a vertical plane at right angles to the longitudinal direction of the frame, up to an angle in the said interval of 30-50°.

The second, shaped portion of the supporting bracket may be arranged to extend at least partially below said frame, in contact therewith, and may be arranged to locate the tank relative to the second shaped surface of the tank. In order to prevent chafing or damage to the tank when mounted, a smooth, rounded or curved transition section may be provided between the first and second shaped portions of the supporting bracket.

According to a further embodiment, the first, shaped portion of the supporting bracket has a lower section provided with a protrusion for cooperation with a corresponding indentation in the tank. This indentation may extend a further distance into the tank relative to the recess. The protrusion is preferably, but not necessarily located at or above the transition section between the first and second shaped portions.

By providing the liquid tank with shaped, load bearing surfaces adjacent each supporting bracket on the frame of the vehicle, said bracket can be made relatively small and compact. As the supporting bracket only extends a relatively short distance away from the side and lower surface of the frame, said bracket imposes minimal restrictions on the volumetric capacity of the liquid tank. In this way, the volume of a single, unitary tank can be maximized by allowing it to follow the outer contours of the side and lower surface of the frame, and to extend underneath at least parts of the vehicle frame. This arrangement allows the capacity of the liquid tank to be increased by at least 25% as compared to a standard D-shaped tank with the same longitudinal extension along the vehicle frame.

The first, shaped portion of the supporting bracket may be attached to a substantially vertical section of frame. The attachment may be achieved by any suitable means, such as a bolt and nut connection, riveting or welding.

The second, shaped portion of the supporting bracket is preferably, but not necessarily resting against the lower surface of the frame. Alternatively the second, shaped portion may be attached to the lower, substantially horizontal section of the frame. The attachment may be achieved by the means listed above, or by attaching or hooking the inner section of the supporting bracket is around an inner edge of a lower, substantially horizontal section of the frame.

Mounting a liquid tank a tank according to the invention, using one or more flexible clamping elements cooperate with supporting brackets for fastening the tank to the vehicle, can be achieved as follows. After attaching the supporting brackets to the frame, the tank is lifted into bearing contact against the first, shaped portions supporting brackets. The tank is then turned inwards and upwards about a longitudinal axis along said first, shaped portions until the second, shaped portions of the tank engages with the corresponding second, shaped portions supporting brackets so as to position the tank in a predetermined position. Finally, clamping elements are fastened to each supporting bracket and tightened around the tank. In order to prevent the tank from collapsing when the clamping elements are attached, the tank may be provided with internal supporting walls. Such supporting walls are preferably, but not necessarily, arranged as substantially vertical walls provided adjacent at least each supporting bracket. These walls may also act as baffles in the tank, to prevent the fluid from sloshing between the ends of the tank. At the same time, the walls should not prevent liquid from flowing towards the lowest point of the tank. A supporting wall of this type may comprise a solid vertical wall, having openings at a number of suitable locations, or have the shape of a rib or wall of varying extension from the inner peripheral surface of the tank.

Alternatively, the supporting brackets may be fastened to the tank in advance, whereby the assembled tank and brackets can be mounted at a predetermined location on the frame as a unit.

If the locating member is suitably dimensioned, a tank can be positioned and secured with just one such member. However, the number of supporting brackets is dependent on the size and location of the tank. For instance, two or three supporting brackets are commonly used for attaching a fuel tank for a commercial vehicle such as a truck.

BRIEF DESCRIPTION OF DRAWINGS

The invention will be described in greater detail below by way of illustrative embodiments with reference to the appended diagrammatic drawing figures, in which.

DETAILED DESCRIPTION

Figure 1:
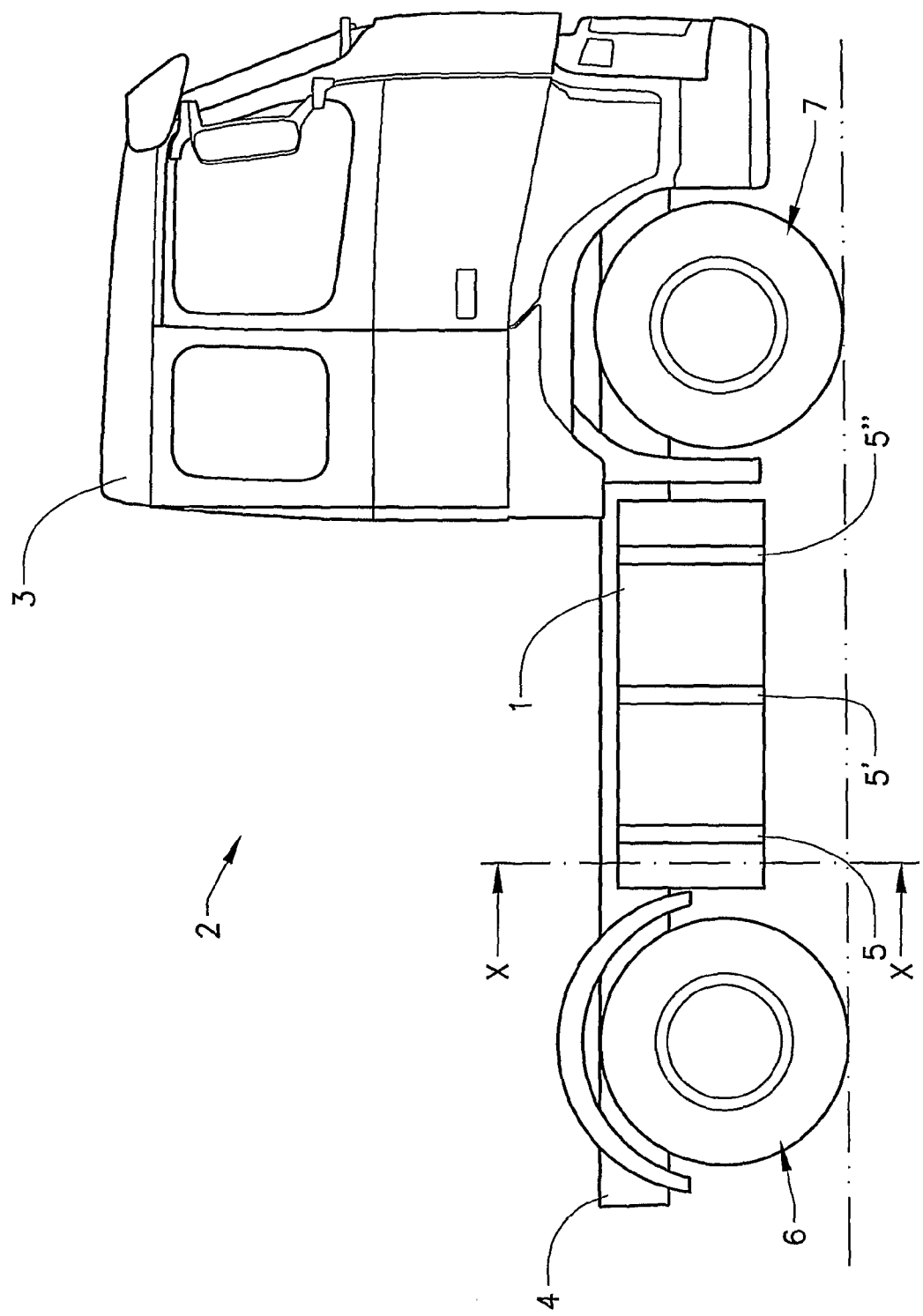
FIG. 1 shows a tank according to the invention mounted on a vehicle.

FIG. 1 shows a tank 1 according to the invention mounted on a vehicle 2. Although the vehicle shown is of the cab-forward type, having a drivers cab 3 located over an engine (not shown), the tank configuration is not limited to vehicles of this type. The tank 1 is mounted to a frame 4, including a pair of longitudinal U-shaped beams, by means of an attachment means comprising of three flexible straps 5, 5', 5" attached to a pair of supporting brackets bolted onto an outer substantially vertical surface on one or both sides of the vehicle. The arrangement of the straps will be described in further detail in connection with FIG. 3 below. In this embodiment, the tank 1 is located between a rear and a front wheel 6, 7 on the vehicle.

Figure 2:
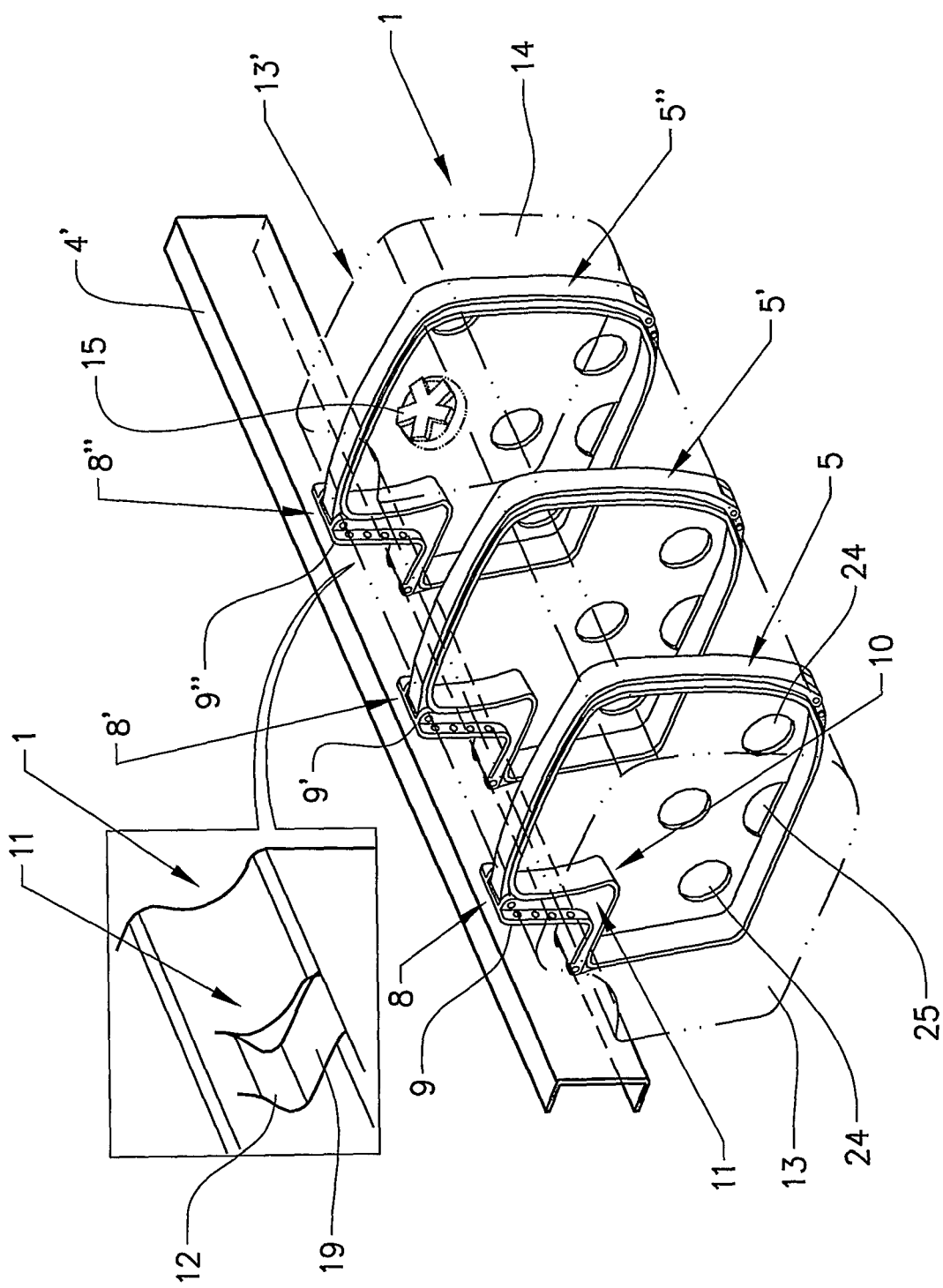
FIG. 2 shows a perspective view of one possible tank configuration according to a first embodiment of the invention.

FIG. 2 shows a perspective view of one possible tank configuration according to a first embodiment of the invention. The tank 1, indicated by dashed lines for clarity, is fastened to a part of the vehicle frame 4 (see FIG. 1) in the form of a longitudinal beam 4' by means of three supporting brackets 8, 8', 8". Each supporting bracket 8, 8', 8" is provided with flexible straps 5, 5', 5", which straps are attached to upper and lower sections of the supporting bracket 8, 8', 8" and extend around the outer circumference of the tank to hold it in place. The attachment, tensioning and clamping of the straps around the tank will be described in further detail below.

The supporting brackets 8, 8', 8" each comprise a substantially L-shaped attachment section 9, 9', 9" having a rear surface in contact with a substantially vertical and a lower substantially horizontal surface the beam 4'. The width of the attachment section 9, 9', 9" in the longitudinal direction of the frame is larger than the width of a front surface of the supporting bracket 8, 8', 8" that is in contact with the tank. The front surface of each supporting bracket 8, 8', 8", extending away from said attachment section 9, 9', 9", has a shaped surface 10 arranged for load bearing and locating contact with a shaped portion, or recess 11 extending into the tank 1. This recess 11 is shown in a partial view in FIG. 2, showing a rear section of the tank 1. In FIG. 2 the tank 1 indicated by dashed lines comprises two end face portions 13, 13' and a shell portion 14 with a non-symmetrical cross-section extending there between. The portion of the tank 1 facing away from the vehicle frame has a substantially rectangular cross-section (see FIG. 3). Adjacent each supporting bracket 8, 8', 8" the tank 1 is provided with said recess 11, facing the beam 4'. The shape of the recess 11 conforms to the outer shaped surface 10 of the supporting bracket 8, 8', 8", as indicated by the partial cross-section of the tank 1, showing the shape of the circumference of the tank adjacent each supporting bracket 8, 8', 8" and its associated strap 5, 5', 5". The shape of the recess 11 in the tank and the outer shaped surface 10 of the supporting bracket will be described in further detail in connection with FIGS. 3-6 below. The upper surface of the tank 1 is provided with a filling tube 15 and an attachment (not shown) for connecting fuel conduits for withdrawing fuel from the tank.

Figure 3:
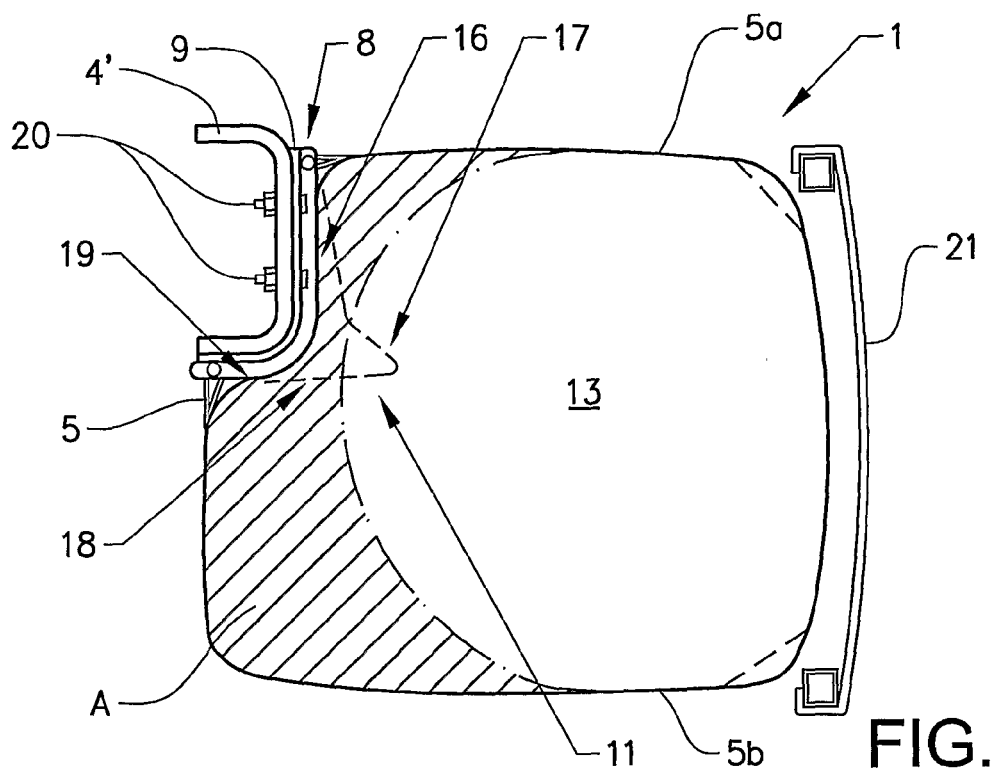
FIG. 3 shows an end view of the liquid tank according to FIG. 2, in which the tank is shown fastened by means of supporting brackets and straps to a vehicle frame.

FIG. 3 shows an end view of the tank 1 according to FIG. 2, in which the tank 1 is fastened to the beam 4' by means of the supporting bracket 8 and the flexible strap 5. For reasons of clarity only one attachment means will be described in the subsequent text. The recess 11 in the tank has a first surface 12 arranged for load bearing contact against a first shaped surface 16, 17 of the supporting bracket 8. This first surface comprises an upper contact surface 16, which absorbs part of the horizontal component of the force caused by the force exerted on the tank 1 by the strap 5. The upper contact surface 16 is substantially parallel to the vertical section of the beam 4'. The first surface also comprises a lower contact surface 17, which absorbs the vertical component of the force caused by the weight of the tank 1 and to the remaining part of the horizontal component of the force exerted onto the tank 1 by the strap 5. The lower contact surface 17 is angled downwards and away from the vertical section of the beam 4'. A second, shaped surface of the supporting bracket 8 comprises a locating surface 18, extending below and substantially parallel to the beam 4', is arranged to locate the tank 1 by cooperation between a lower section 19 of the recess 11 and the locating surface 18 of the supporting bracket 8. The supporting bracket 8 is attached to the beam 4' by bolted joints 20 through holes in the vertical section of the attachment section 9 on either side of the shaped surface 10 of the supporting bracket 9. In FIG. 3, the cross-hatched area A schematically denotes the additional tank volume available by allowing the tank 1 to extend underneath the beam 4'. An underrun protection device 21 is arranged adjacent the outer surface of the tank 1 and attached to the beam 4' at either end of the tank.

Figure 4:
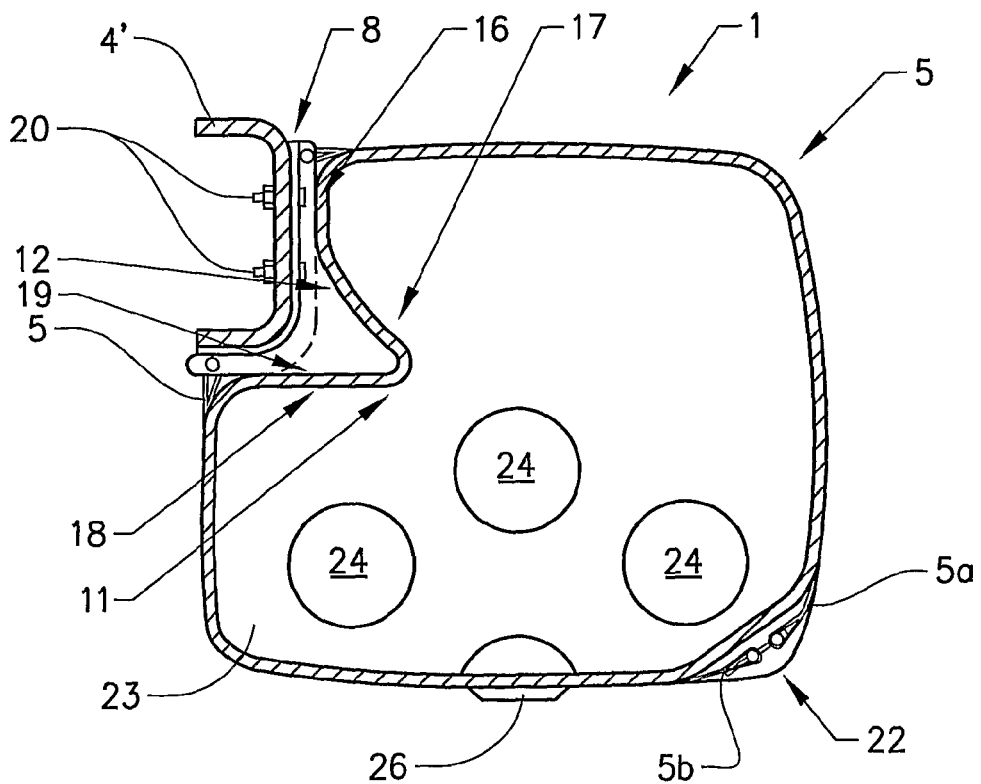
FIG. 4 shows a schematic cross-section of the tank shown in FIG. 1

FIG. 4 shows a schematic cross-section of the tank as shown in FIG. 1. The supporting bracket 8 and the cooperating recess 11 have been described in connection with FIG. 3 above and are indicated using the same reference numerals. The flexible strap 5 attaching the tank 1 to the supporting bracket 8 comprises a pair of upper and lower straps 5a, 5b, wherein one end of the respective strap 5a, 5b is attached to the supporting bracket 8 while the opposite ends of said straps are connected by a clamping device 22 adjacent an outer, lower corner of the tank 1. The attachment of the pair of straps 5a, 5b is described in connection with FIGS. 7 and 8 below. Also, FIG. 4 shows an example of how the tank may be provided with at least one internal supporting wall 23. In this example such supporting walls are arranged as substantially vertical walls adjacent each of the supporting brackets 8, 8', 8". The supporting wall 23 may also act as a baffle provided with a number of first openings 24 in the tank, in order to prevent liquid from sloshing between the ends of the tank. In this example three identical openings are shown, but the number and size of the hole or holes may be varied freely. At the same time the supporting wall has a further opening 25 at the bottom of the tank allowing liquid to flow towards a recess 26 forming the lowest point of the tank 1.

Figure 5A:
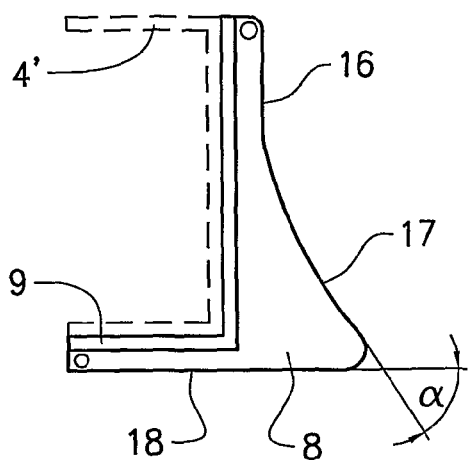
FIG. 5 shows side views of a number of alternative supporting brackets according to the invention.

FIGS. 5A-E show side views of a number of alternative supporting brackets according to the invention. FIG. 5A shows a supporting bracket 8 as described in FIGS. 2-3, having an upper contact surface 16 substantially parallel to the beam 4' and a lower contact surface 17 is angled downwards and away from the vertical section of the beam 4'. The lower contact surface 17 can be located at an angle α of up to 30-50° relative to a horizontal plane, before curving round to meet the locating surface 18 of the supporting bracket 8. In this embodiment, the locating surface 18 is substantially parallel to a lower horizontal section of the beam 4'. The shape of the upper and lower contact surfaces can be adapted in shape and size. Such adaptations include conforming the supporting bracket to the shape of the tank and/or dimensioning the height and the width of the supporting bracket and/or the angle α or curvature of the lower contact surface for a predetermined size of tank.

Figure 5D:
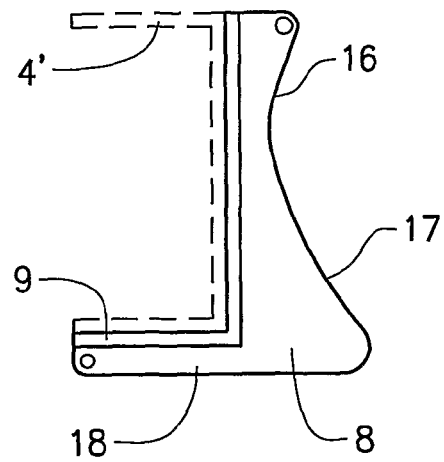
Figure 5B:
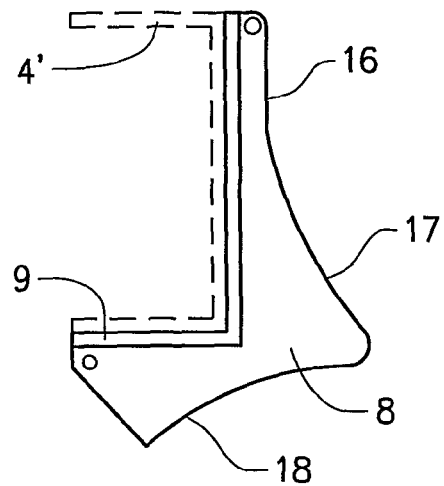
Figure 5E:
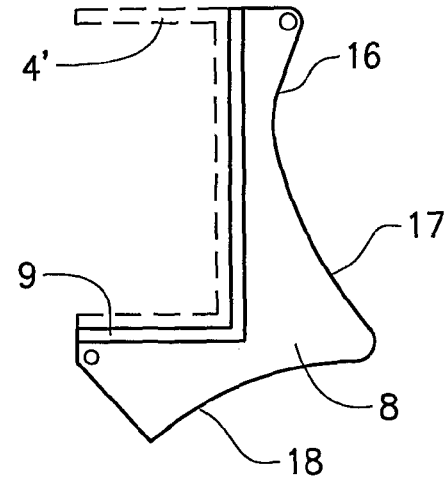
Figure 5C:
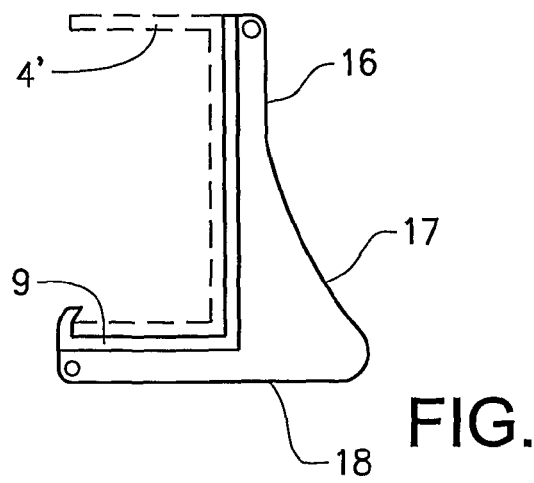

FIG. 5B shows a supporting bracket 8 as described in FIG. 5A, but having a locating surface 18 curved inwards and downwards relative to the beam 4'. FIG. 5C shows a supporting bracket 8 as described in FIG. 5A, but having a section of the L-shaped attachment section 9 hooked around an inner edge of the lower horizontal section of the beam 4'. FIG. 5D shows a supporting bracket 8 as described in FIG. 5A, but having an upper contact surface 16 curved inwards and downwards relative to the vertical section of the beam 4'. The curvature of the upper contact surface 16 continues in a smooth transition into the lower contact surface 17. FIG. 5E having upper and lower contact surfaces 16, 17 as shown in FIG. 5D, but with a locating surface 18 curved inwards and downwards relative to the beam 4', as shown in FIG. 5B. The above examples indicate that the general shape of the first and second shaped surfaces 16, 17; 18 of the supporting bracket 8 can be varied freely within the scope of the invention.

Figure 6A:
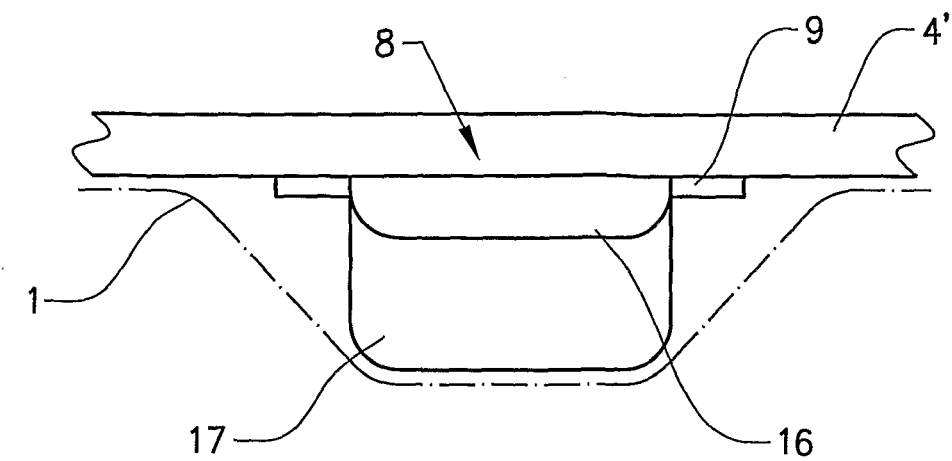
FIG. 6 shows plan views of a number of alternative supporting brackets according to the invention.
Figure 6B:
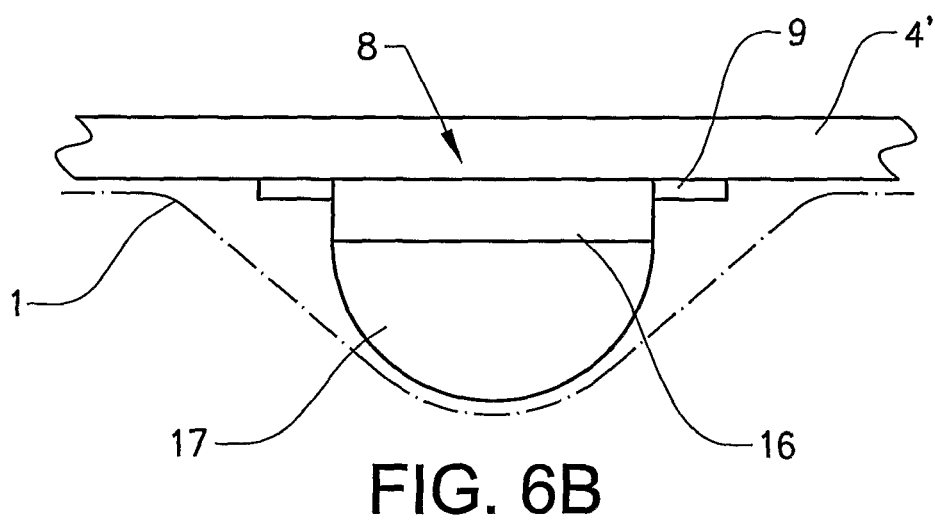
Figure 6C:
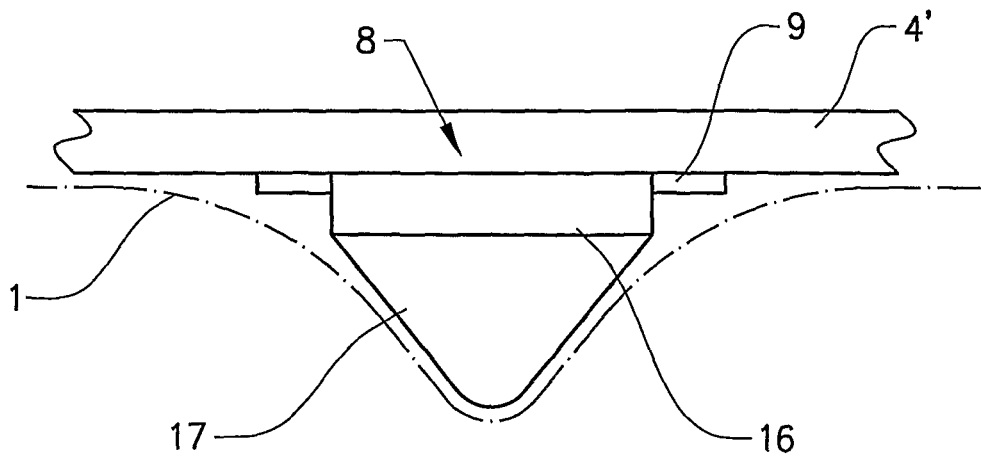

FIGS. 6A-C shows plan views of a number of alternative supporting brackets according to the invention. FIG. 6A shows a supporting bracket 8 as described in FIGS. 2-3, having an upper contact surface 16 and a lower contact surface 17 as well as an attachment section 9 extending horizontally outwards on either side of the supporting bracket 8. In FIG. 6A, the outer contour of the lower contact surface 17 has a substantially rectangular shape with rounded corners to avoid chafing between the supporting bracket 8 and the tank. In FIG. 6B the outer contour of the lower contact surface 17 has a substantially semi-circular shape, while FIG. 6C shows a contour having a combined rounded and triangular shape. The above examples may be combined with any of the embodiments of FIGS. 5A-E to form a suitable supporting bracket 8.

Figure 7:
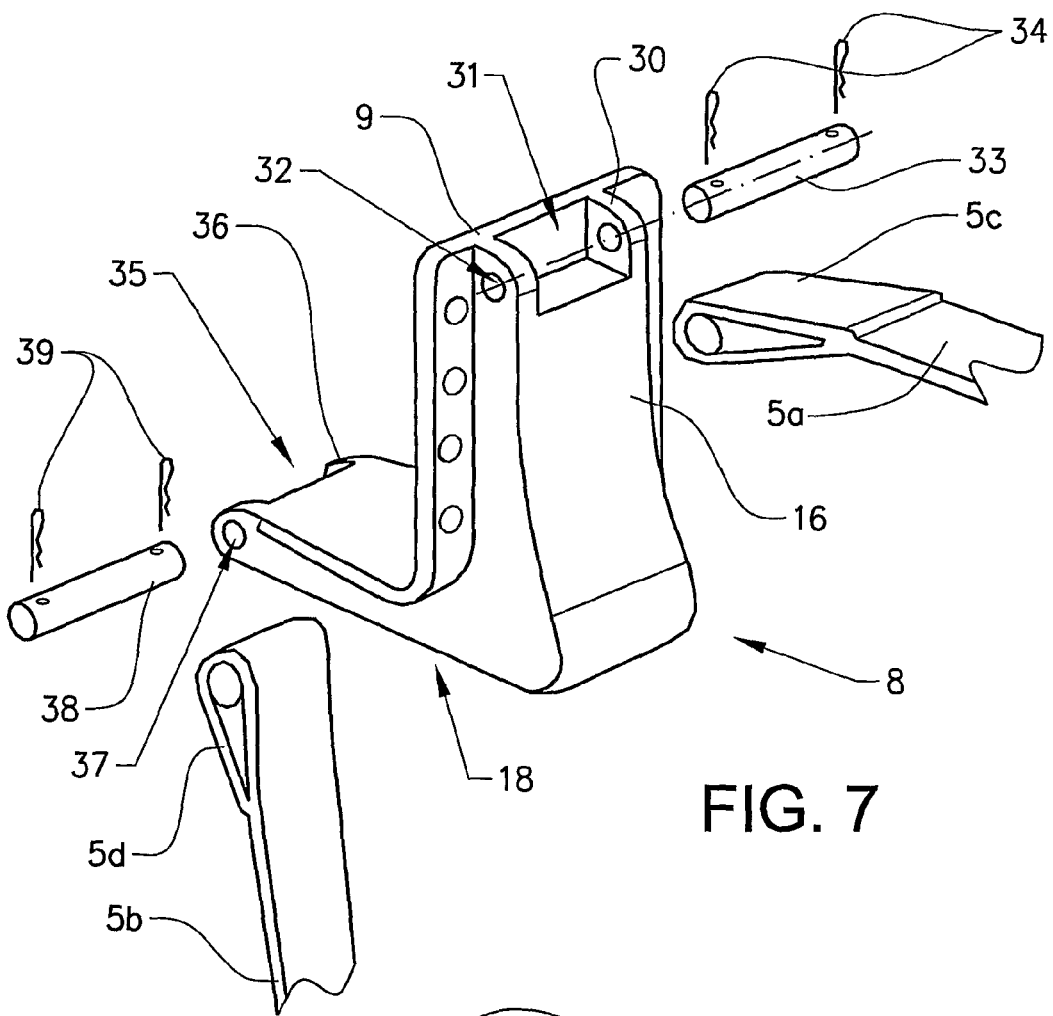
FIG. 7 shows attachment means for straps on a supporting bracket according to the invention.

FIG. 7 shows attachment means for attaching a pair of straps 5a, 5b on a supporting bracket 8 according to the invention. An upper portion 30 of the supporting bracket 8, located above the upper contact surface 16, is provided with a recess 31 into an upper and outer surface of said upper portion 30. Through holes 32 are provided through the upper portion 30 of the supporting bracket 8 and the recess 31 in a direction parallel to the beam 4' (see FIG. 2) onto which the supporting bracket 8 is attached. The upper flexible strap 5a is attached to the supporting bracket 8 by placing a folded end section 5c, forming a loop, in the recess 31 and inserting a locking pin 33 through the through holes 32, the recess 31 and the folded end section 5c. In order to fix the locking pin 33 in place, a spring clip 34 is inserted through a hole through either end of the locking pin 33 adjacent a side surface on either side of the upper portion 30.

Similarly, a second recess 35 is provided into an inner end portion 36 of the supporting bracket 8 adjacent the inner end of the locating surface 18. Through holes 37 are provided through the inner end portion 36 of the supporting bracket 8 and the recess 31 in a direction parallel to the beam 4'. The lower flexible strap 5b is attached to the supporting bracket 8 by placing a folded end section 5d, forming a loop, in the recess 35 and inserting a locking pin 38 through the through holes 37, the recess 35 and the folded end section 5d. In order to fix the locking pin 38 in place, a spring clip 39 is inserted through a hole through either end of the locking pin 38 adjacent a side surface on either side of the inner end portion 36.

Figure 8:
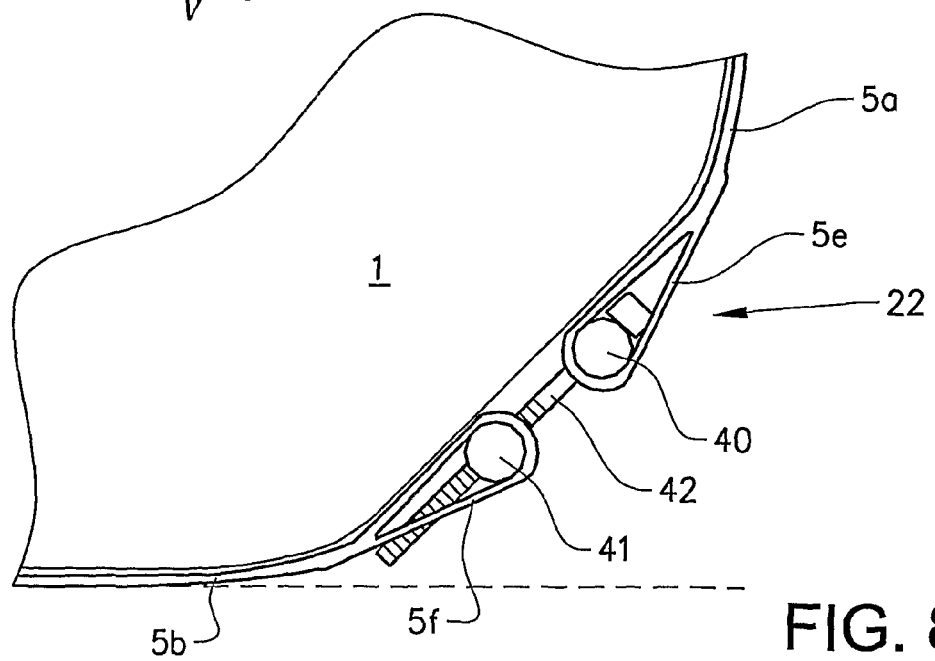
FIG. 8 shows attachment means between straps as shown in FIG. 7.

FIG. 8 shows attachment means between straps as shown in FIG. 7.

The flexible strap attaching the tank 1 to the supporting bracket 8, as shown in FIG. 7, comprises a pair of upper and lower straps 5a, 5b, wherein one end of the respective strap 5a, 5b is attached to the supporting bracket 8 while the opposite ends of said straps are connected by a clamping device 22 adjacent an outer, lower corner of the tank 1. Each end of the upper and lower straps has a folded end section 5e, 5f, forming a loop with a central slot in the main direction of the respective strap. The folded end section 5e, 5f are positioned adjacent each other at the outer, lower corner of the tank 1 after having been attached to the supporting bracket 8. The clamping device 22 comprises a first and a second pin 40, 41, which are inserted into the loop of the respective folded end section 5e, 5f. A screw 42 is inserted through a hole in the first pin 40 and extends into a threaded hole in the second pin 41. By tightening the screw 42, the folded end sections 5e, 5f are drawn together and the tank 1 is clamped onto the supporting bracket 8.

The invention is not limited to the above examples, but may be varied freely within the scope of the claims.

The invention claimed is:

1. Liquid tank for a heavy vehicle, the tank being fastenable to a vehicle frame beam of a vehicle chassis by at least one supporting bracket having first and second shaped surfaces arranged for load bearing and locating contact against the liquid tank, the tank comprising two end face portions and a shell portion with a non-symmetrical cross-section extending there between, a first, shaped portion facing the frame beam, arranged for load bearing contact against the first shaped surface of the supporting bracket, a generally upwardly facing second, shaped portion defining, together with the first, shaped portion, a recess such that the second, shaped portion is adapted to extend, at least partially, directly, vertically below the frame beam, the second, shaped portion being arranged to locate the tank relative to the second shaped surface of the supporting bracket, and a third, substantially rectangular portion facing away from the frame beam, wherein the tank is fastenable to the bracket by at least one clamping means.

2. Liquid tank according to claim 1, wherein the first, shaped portion of the tank has an upper section arranged to take up a substantially horizontal load between the tank and the first shaped surface of the supporting bracket.

3. Liquid tank according to claim 2, wherein the first, shaped portion of the tank has a lower section arranged to take up a substantially vertical load between the tank and the first shaped surface of the supporting bracket.

4. Liquid tank according to claim 3, wherein the first, shaped portion of the tank has a lower section provided with an indentation for cooperation with a corresponding protrusion on the supporting bracket.

5. Liquid tank according to claim 1, wherein the second, shaped portion of the tank extending partially below the frame beam, is arranged to locate the tank relative to the second shaped surface of the supporting bracket.

6. Liquid tank according to claim 1, wherein the tank extends below the frame beam up to a vertical plane delimiting an inner longitudinal surface of the frame beam.

7. Liquid tank according to claim I, wherein the tank is provided with a substantially vertical supporting wall around at least parts of its internal circumference adjacent each bracket.

8. Liquid tank according to claim 1, wherein the tank is fastenable to the bracket by clamping means attached to the bracket and extending around the outer circumference of the tank.

9. Liquid tank according to claim 1, wherein the tank is fastenable to the bracket by first clamping means extending over the tank from an upper part of the bracket to an outer, lower corner of the third, substantially rectangular portion and second clamping means extending under the tank from a lower part of the bracket to the outer, lower corner of the third, substantially rectangular portion.

10. Fastening arrangement for supporting a liquid tank on a frame beam of a vehicle chassis for a heavy vehicle, which fastening arrangement comprises at least one supporting bracket having shaped surfaces arranged for load bearing and locating contact against the liquid tank, which tank comprises two end face portions and a shell portion with a non-symmetrical cross-section extending there between, wherein the supporting bracket is attached to a substantially vertical surface of the frame beam and comprises a first, shaped surface, which first surface is arranged for load bearing contact against a first shaped portion of the tank, the supporting bracket being in contact with a lower surface of the frame beam and comprising a generally downwardly facing second, shaped surface arranged to extend, at least partially, directly, vertically below the frame beam and to contact a second shaped portion of the tank, and attachment means for fastening the tank to the bracket by at least one clamping means.

11. Fastening arrangement according to claim 10, wherein the first, shaped surface of the supporting bracket has an upper section arranged to support a substantially horizontal load between the supporting bracket and the first shaped portion of the tank.

12. Fastening arrangement according to claim 11, wherein the upper section of the first, shaped surface of the supporting bracket is substantially parallel to or angled downwards and towards the frame beam.

13. Fastening arrangement according to claim 11, wherein the first, shaped surface of the supporting bracket has a lower section arranged to support at least a substantially vertical load between the supporting bracket and the first shaped portion of the tank.

14. Fastening arrangement according to claim 12, wherein the lower section of the first, shaped surface of the supporting bracket is angled downwards and away from the frame beam at an angle of 30-50°.

15. Fastening arrangement according to claim 12, wherein the first, shaped surface of the supporting bracket has a lower section provided with a protrusion for cooperation with a corresponding indentation in the tank.

16. Fastening arrangement according to claim 10, wherein the second, shaped surface of the supporting bracket is arranged to extend, at least partially, directly, vertically below the frame beam, in contact therewith, is arranged to locate the tank relative to the second shaped portion of the tank.

17. Fastening arrangement according to claim 10, wherein the second, shaped surface of the supporting bracket is attached to a lower, substantially horizontal section of the frame beam.

18. Fastening arrangement according to claim 10, wherein the second, shaped surface of the supporting bracket is attached around an inner edge of a lower, substantially horizontal section of the frame beam.

* * * * *